(12) United States Patent
Becher

(10) Patent No.: US 8,984,948 B2
(45) Date of Patent: Mar. 24, 2015

(54) TUBE-EQUIPPED, FLANGED, PRESSURE TRANSFER MEANS, PRESSURE MEASURING ARRANGEMENT WITH SUCH A TUBE-EQUIPPED, FLANGED, PRESSURE TRANSFER MEANS AND PRESSURE MEASURING POINT WITH SUCH A PRESSURE MEASURING ARRANGEMENT

(71) Applicant: Endress + Hauser GmbH + Co. KG, Maulburg (DE)

(72) Inventor: Raimund Becher, Ehrenkirchen (DE)

(73) Assignee: Endress + Hauser GmbH + Co. KG, Maulburg (DE)

(*) Notice: Subject to any disclaimer, the term of this patent is extended or adjusted under 35 U.S.C. 154(b) by 276 days.

(21) Appl. No.: 13/709,315

(22) Filed: Dec. 10, 2012

(65) Prior Publication Data
US 2013/0167961 A1 Jul. 4, 2013

(30) Foreign Application Priority Data
Dec. 12, 2011 (DE) .......................... 10 2011 088 303

(51) Int. Cl.
*G01L 7/00* (2006.01)
*F15B 3/00* (2006.01)
*G01L 19/00* (2006.01)

(52) U.S. Cl.
CPC ................. *F15B 3/00* (2013.01); *G01L 19/003* (2013.01); *G01L 19/0046* (2013.01)
USPC .......................................................... 73/714

(58) Field of Classification Search
USPC ................................................. 73/700–756
See application file for complete search history.

(56) References Cited

U.S. PATENT DOCUMENTS

| | | | |
|---|---|---|---|
| 6,845,674 B2 * | 1/2005 | Becher et al. | 73/717 |
| 6,848,318 B2 | 2/2005 | Gerst | |
| 7,441,461 B2 | 10/2008 | Muth | |
| 8,276,457 B2 * | 10/2012 | Philipps | 73/716 |
| 8,490,494 B2 * | 7/2013 | Parrotto et al. | 73/706 |
| 8,511,151 B2 * | 8/2013 | Becher et al. | 73/74 |

(Continued)

FOREIGN PATENT DOCUMENTS

| DE | 103 19 417 A1 | 11/2004 |
|---|---|---|
| DE | 10319417 A1 | 11/2004 |

(Continued)

OTHER PUBLICATIONS

German Search Report, Aug. 23, 2012, Munich.

*Primary Examiner* — Andre Allen
(74) *Attorney, Agent, or Firm* — Bacon & Thomas, PLLC

(57) ABSTRACT

A tube-equipped, flanged, pressure transfer structure comprises a flange for connecting to a counterflange; a tube, which is secured to the flange; a hydraulic path, which extends from a first opening in a front end surface of the tube facing away from the flange to a second opening in the rear end surface of the flange facing away from the tube; and an isolating diaphragm, which covers the first opening and is connected pressure-tightly with the front end surface of the tube along a peripheral edge, wherein the hydraulic path is filled or fillable with a pressure transfer liquid, in order to transfer a pressure presiding at the isolating diaphragm to the second opening, wherein the tube has a front section having the end surface and a first diameter and an intermediate section with a second diameter, which is less than the first diameter, and wherein the front section is shorter than the intermediate section.

12 Claims, 3 Drawing Sheets

(56) References Cited

U.S. PATENT DOCUMENTS

| | | | |
|---|---|---|---|
| 8,522,625 B2* | 9/2013 | Philipps | 73/861.52 |
| 8,726,735 B2* | 5/2014 | Humpert et al. | 73/716 |
| 2011/0113889 A1* | 5/2011 | Funken et al. | 73/715 |
| 2012/0017690 A1* | 1/2012 | Philipps | 73/724 |
| 2012/0125193 A1* | 5/2012 | Philipps | 92/5 R |

FOREIGN PATENT DOCUMENTS

| | | |
|---|---|---|
| DE | 102006049942 A1 | 4/2008 |
| DE | 4025664 C1 | 8/2012 |
| EP | 1128172 A1 | 8/2001 |
| WO | WO 2008/046768 A1 | 4/2008 |

* cited by examiner

TUBE-EQUIPPED, FLANGED, PRESSURE
TRANSFER MEANS, PRESSURE
MEASURING ARRANGEMENT WITH SUCH
A TUBE-EQUIPPED, FLANGED, PRESSURE
TRANSFER MEANS AND PRESSURE
MEASURING POINT WITH SUCH A
PRESSURE MEASURING ARRANGEMENT

TECHNICAL FIELD

The present invention relates to a tube-equipped, flanged, pressure transfer structure, a pressure measuring arrangement with such a tube-equipped, flanged, pressure transfer structure and a pressure measuring point with such a pressure measuring arrangement.

BACKGROUND DISCUSSION

Tube-equipped, flanged, pressure transfer means of the technical field of the invention comprise: a flange for connecting the tube-equipped, flanged, pressure transfer structure to a tubular opening of a container or pipeline, which tubular opening is surrounded by a counterflange; a tube, which is secured, especially coaxially, to the flange and which protrudes from the plane of the flange, in order to protrude inwardly into the tubular opening; a hydraulic path, which extends from a first opening in a front end surface of the tube facing away from the flange, through the tube and through the flange, to a second opening in the rear end surface of the flange facing away from the tube; and an isolating diaphragm, which covers the first opening and is connected pressure-tightly with the front end surface of the tube along at least one peripheral edge, in order to form a pressure chamber between the isolating diaphragm and the front end surface of the tube, wherein the pressure chamber and the hydraulic path are filled with a pressure transfer liquid, in order to transfer a pressure presiding at the isolating diaphragm to the second opening.

Sense and purpose of the tube-equipped, flanged, pressure transfer structure is, for example, in the case of pressure measuring points arranged in so-called dished boiler ends, to assure that the isolating diaphragm is not so far back in a tubular flange connection relative to the surface of the dished boiler end that it is covered by thick sediments and thereby decoupled from the process to be monitored.

Tube-equipped, flanged, pressure transfer structure serve, especially in processes with large temperature differences relative to the environment, to bring the isolating diaphragm out of the plane of the flange and through the tubular opening, whose length often serves as a distance, over which the temperature can fall from that of the process to that of the environment, into a region of the pipeline or the container, in which there is no danger that, because of a temperature differing from that of the process, the isolating diaphragm is supplied with an incorrect pressure, or that process medium condenses or crystallizes on the isolating diaphragm. The length of the tube amounts, in such case, often to a number of diameters of the tubular opening.

Insofar as a condensation or crystallization of the medium is also to be prevented in the annular gap between the tube of the pressure transfer means and the tubular opening, it is usual that the tube fills the tubular opening as much as possible.

This requirement causes a relatively large volume for the tube and, associated therewith, a large mass, as is indicated, for example, in FIG. 4 for a tube-equipped, flanged, pressure transfer means 101 according to the state of the art. A flange 102 bears, in such case, a solid cylinder 104, on whose end an isolating diaphragm 110 encloses a pressure chamber, from which a bore 120 extends through the solid cylinder 104 to the rear-side of the flange, in order to transfer there the pressure presiding at the isolating diaphragm 110. Especially, tube-equipped, flanged, pressure transfer structure of corrosion resistant alloys are, therefore, very expensive. An approach for reducing the material expense is shown in FIG. 5, where, instead of a solid tube, a comparatively thin walled tube 204 is welded to the flange 202, wherein the hydraulic path between the separating diaphragm 210 and the rear-side of the flange 202 is then brought through the tube by means of a capillary line 220. The capillary line is then connected, on the one hand, with the flange 202 and, on the other hand, with a front end plate of the tube. The isolating diaphragm 210 is connected pressure-tightly to the front end place. This approach is burdened with high manufacturing risks.

SUMMARY OF THE INVENTION

It is, therefore, an object of the present invention to improve this situation present in the prior art. The object is achieved according to the invention by the tube-equipped, flanged, pressure transfer structure. which includes a flange for connecting the tube-equipped, flanged, pressure transfer structure to a tubular opening of a container or line, which tubular opening is surrounded by a counterflange; a tube, which is secured especially coaxially to the flange, and which protrudes from the plane of the flange, in order to protrude inwardly into the tubular opening; a hydraulic path, which extends from a first opening in a front end surface of the tube facing away from the flange through the tube and through the flange to a second opening in the rear end surface of the flange facing away from the tube; and an isolating diaphragm, which covers the first opening and is connected pressure-tightly with the front end surface of the tube along at least one peripheral edge, in order to form a pressure chamber between the isolating diaphragm and the front end surface of the tube, wherein the pressure chamber and the hydraulic path are filled with a pressure transfer liquid, in order to transfer a pressure presiding at the isolating diaphragm to the second opening, wherein according to the invention the tube has at least a form-retaining front section with a first average diameter and a form-retaining intermediate section with a second average diameter, wherein the first end surface is formed by an end face of the front section, wherein the first average diameter is greater than the second average diameter, wherein the intermediate section is arranged between the front section and the flange, and wherein the front section has a first axial length, and the intermediate section has a second axial length, wherein the first axial length is less than the second axial length.

In a further development of the invention, the front section includes a lateral surface, which has at least one sealing surface, in order to seal the front section radially against a tubular opening.

In a further development of the invention, the sealing surface includes an annularly surrounding recess, in order to guide a peripheral sealing ring at least partially axially.

In a further development of the invention, the first axial length is less than the first axial diameter.

In a further development of the invention, the second axial length amounts to at least twice, especially at least four times, and preferably at least six times, the first diameter.

In a further development of the invention, the hydraulic path includes an especially traversing bore through the front section and the intermediate section with a diameter of no more than 2 mm, especially no more than 1 mm, preferably no more than 0.5 mm.

In a further development of the invention, the bore is manufactured by means of spark erosion or by means of water jet drilling.

In a further development of the invention, the flanged, pressure transfer structure comprises corrosion resistant metal material, especially stainless steel, such as 1.4403 or 1.4404, Hastelloy, Monel, or tantalum. The materials Hastelloy, Monel, or tantalum are, according to a further development of the invention, applied as plating on a stainless steel base, wherein, especially, and, in given cases, exclusively, the media-contacting regions of the surfaces of the flanged, pressure transfer means are provided with such a plating. The isolating diaphragm can especially be foils of said materials having a thickness of, for example, no more than 100 µm, especially no more than 50 µm.

In a further development of the invention, the front section of the tube comprises Hastelloy, Monel, or tantalum, while the intermediate section is exclusively stainless steel.

The pressure measuring arrangement of the invention includes a tube-equipped, flanged, pressure transfer structure of the invention and a pressure measurement transmitter with a pressure sensor, wherein the pressure measurement transmitter is secured to the flange, in order to supply the pressure sensor with the pressure presiding at the second opening.

The pressure measuring point of the invention includes a pressure measuring arrangement of the invention and a process installation having a tubular process opening and a counterflange around the process opening, wherein the flange of the tube-equipped, flanged, pressure transfer structure is secured to the counterflange such that the tube-equipped, flanged, pressure transfer means protrudes inwardly into the tubular opening.

In a further development of the pressure measuring point of the invention, the tubular opening opens into a line or a container, wherein the isolating diaphragm has an average plane, which is spaced no more than a diameter of the opening, preferably no more than half of a diameter and especially preferably no more than a fourth of a diameter, from an intersection between the central axis of the opening with a surface through the edge of the opening in the region of the opening into the line or into the container.

In a further development of the pressure measuring point of the invention, the front section is radially sealed against the wall of the opening.

In a further development of the pressure measuring point of the invention, the radial sealing occurs by way of an elastic O-ring, which is radially clamped between the lateral surface and the wall of the tubular opening.

BRIEF DESCRIPTION OF THE DRAWINGS

The invention will now be explained based on examples of embodiments presented in the drawing, the figures of which show as follows.

DETAILED DISCUSSION IN CONJUNCTION WITH THE DRAWINGS

Figure 2:
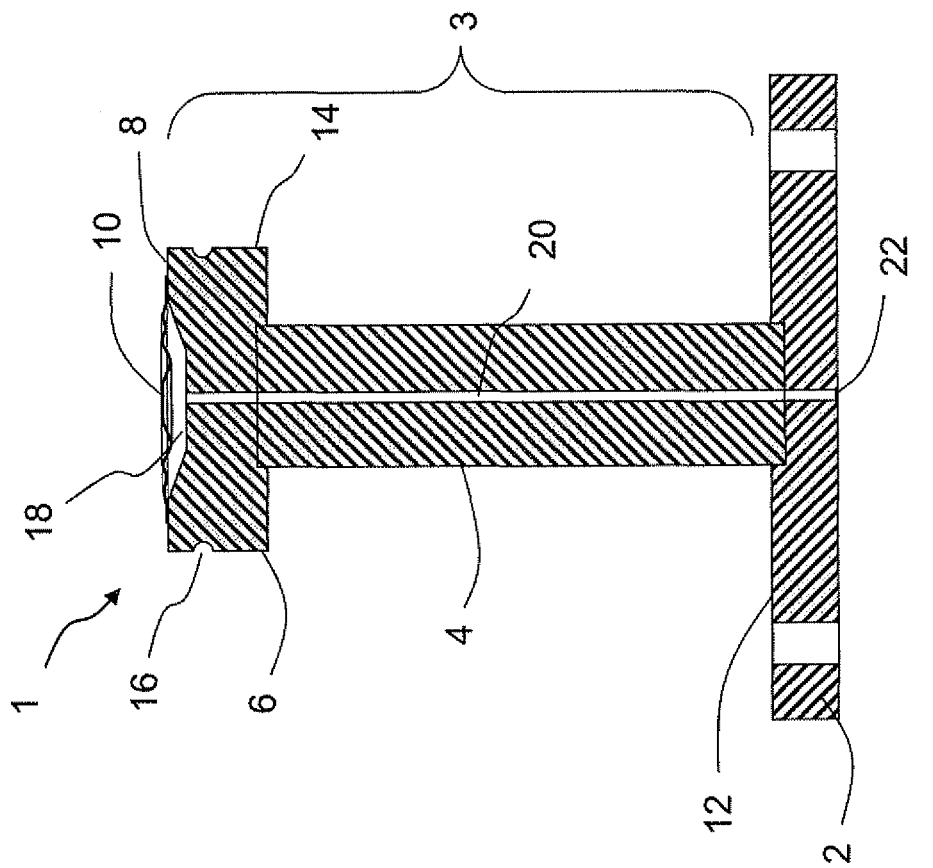
FIG. 2 is a longitudinal section through an example of an embodiment of a tube-equipped, flanged, pressure transfer structure of the invention.
Figure 1:
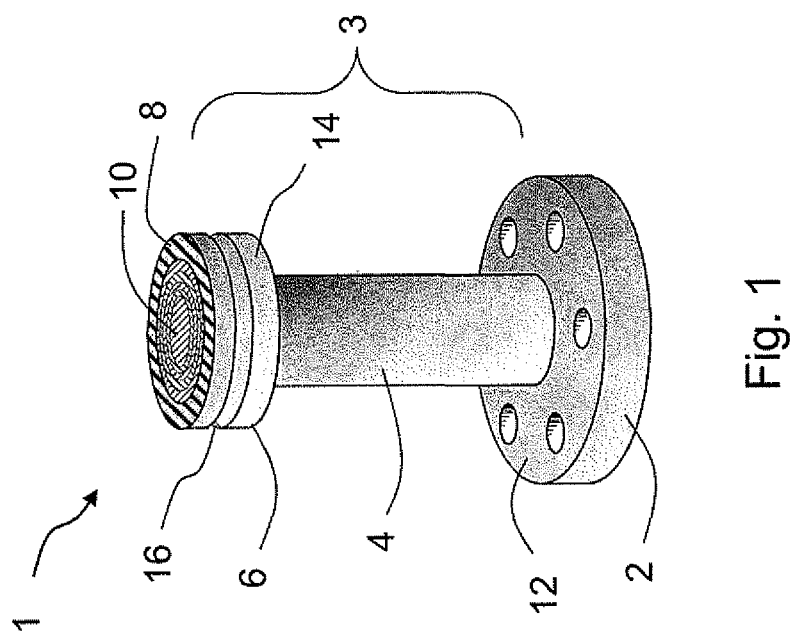
FIG. 1 is an overall view of an example of an embodiment of a tube-equipped, flanged, pressure transfer structure of the invention.

The tube-equipped, flanged, pressure transfer structure 1 shown in FIGS. 1 and 2 includes a metal flange 2. Coaxially extending from the flange 2 is a tube 3. Tube 3 includes a form-retaining intermediate section 4 and a form-retaining front section 6, wherein the diameter of the intermediate section 4 is significantly less than the diameter of the front section 6. On the other hand, the axial length of the front section 6 is significantly less than the axial length of the intermediate section 4. An end face 8 of the front section 6 includes an isolating diaphragm 10, which is contactable with a pressure to be registered.

Isolating diaphragm 10, flange 2, front section 6 and intermediate section 4 comprise a corrosion resistant material, especially stainless steel.

For connecting the tube-equipped, flanged, pressure transfer structure to a counterflange, the tube-equipped, flanged, pressure transfer structure is inserted, with the tube 3 preceding, into an opening of a container or a line, e.g. a pipeline, so that a tube-side surface 12 of the flange lies against a complementary opposite surface of the counterflange of the opening or against an intermediately lying seal.

The front section 6 has essentially an at least sectionally cylindrical shape, wherein, in a lateral surface 14 of the front section, a surrounding groove 16 is provided as seal seat for a sealing ring, for example, an elastomer ring. With such a sealing ring, the front section 6 of the tube 3 radially can be sealed against a tubular opening. The seal can, in given cases, be pressure bearing.

Extending through the tube-equipped, flanged, pressure transfer means from a pressure chamber 18, which is formed on the end of the front section 6 between the end face 8 and the isolating diaphragm 10, to a rear surface 22 of the flange 2 is a bore 20. Bore 20 has a diameter, which is as small as possible, in order to minimize the volume of a pressure transfer liquid, with which the pressure chamber and the bore are to be filled. Suitable diameters are especially less than 1.5 mm, preferably less than 1 mm.

Figure 3:
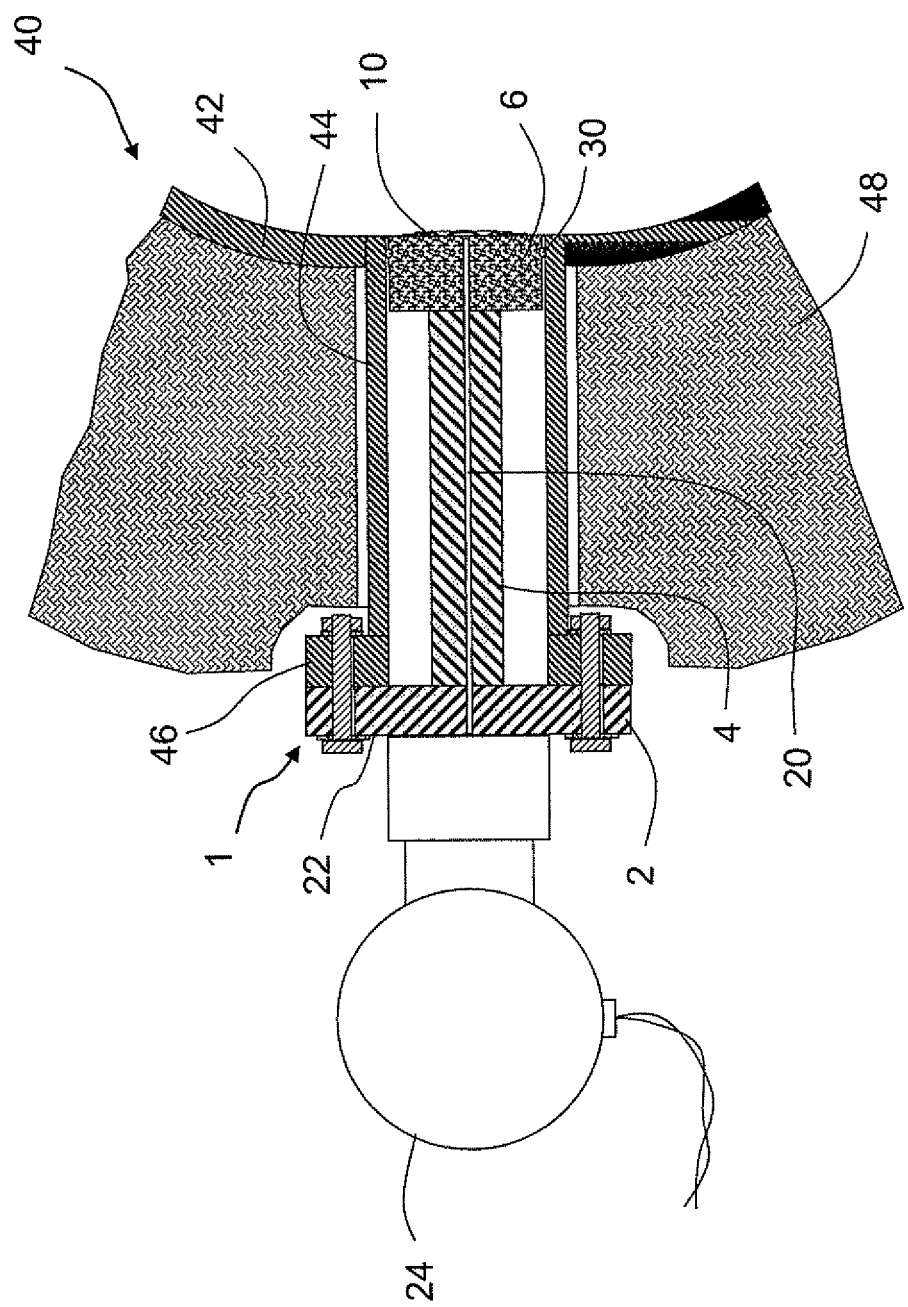
FIG. 3 is a schematic, longitudinal section through an example of an embodiment of a pressure measuring point of the invention.
Figure 5:
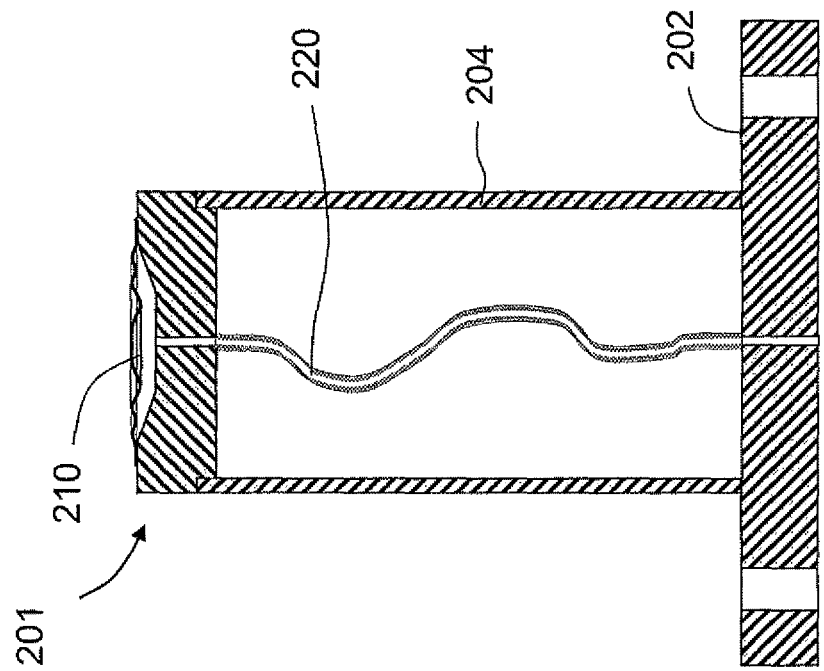
FIG. 5 is a second example of a tube-equipped, flanged, pressure transfer structure according to the state of the art.
Figure 4:
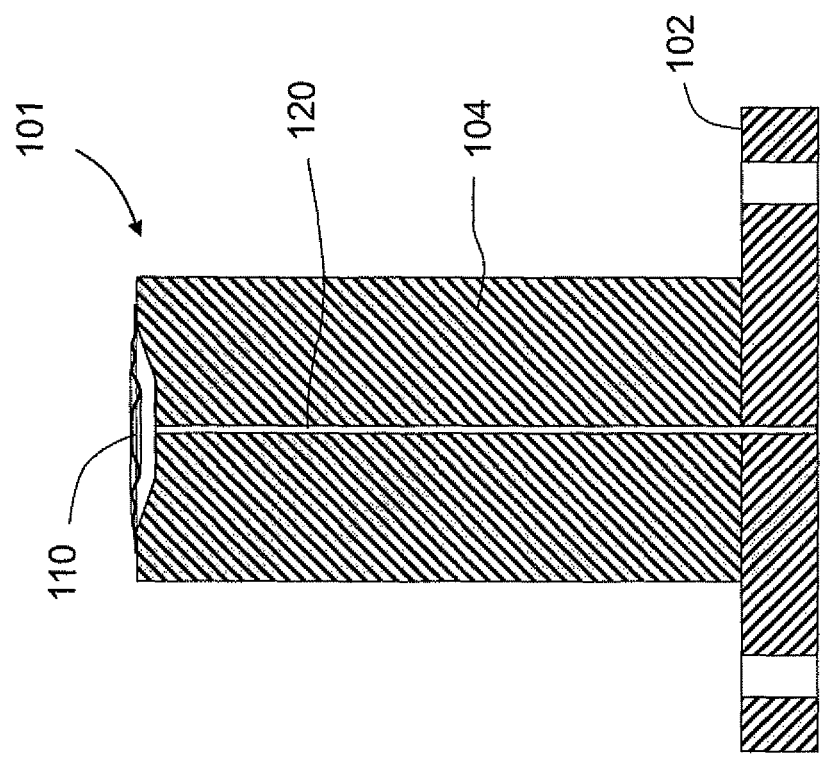
FIG. 4 is a first example of a tube-equipped, flanged, pressure transfer structure according to the state of the art.

FIG. 3 shows an example of a pressure measuring point of the invention, here a pressure measuring arrangement connected to a container 40, wherein the pressure measuring arrangement includes a tube-equipped, flanged, pressure transfer means 1 of the invention and a pressure measurement transmitter 24, which is mounted to the flange 2, in order to register the pressure transferred through the bore 22 and to provide a measured value representing such.

The tube-equipped, flanged, pressure transfer structure 1 is inserted, with the front section 6 preceding, into a container opening of the container 40, wherein the isolating diaphragm 10 is arranged on the end face of the front section 6 essentially flush with a container wall 42 in the vicinity of the container opening. The container opening includes an opening tube 44, wherein the opening tube 44 is welded on a first end with the container wall 42 and on another end with a connection counterflange 46. Flange 2 of the tube-equipped, flanged, pressure transfer structure 1 is bolted to the connection counterflange 46. In given cases, a sealing element is clamped between the two flanges, in order to achieve a pressure tight, process seal. An elastic O-ring 30 is radially clamped in an annular gap between a lateral surface of the front section 6 and the wall of the opening tube 44, in order to seal off a dead volume remaining between the front section 6 and the flange 2 from the interior of the container 40. Container 40 can be, for example, an insulated container having an externally arranged, insulating layer 48, through which the tube-equipped, flanged, pressure transfer structure 1 extends.

The invention claimed is:
1. A tube-equipped, flanged, pressure transfer structure, comprising:
 a flange for connecting the tube-equipped, flanged, pressure transfers structure to a tubular opening of a container or line, which tubular opening is surrounded by a counterflange;
 a tube, which is secured especially coaxially to said flange, and which protrudes from the plane of said flange, in order to protrude inwardly into said tubular opening;
 a hydraulic path, which extends from a first opening in a front end surface of said tube facing away from said flange through said tube and through the flange to a second opening in the rear end surface of said flange facing away from said tube; and
 an isolating diaphragm, which covers said first opening and is connected pressure-tightly with the front end surface of said tube along at least one peripheral edge, in order to form a pressure chamber between said isolating diaphragm and said front end surface of said tube, wherein:
 said pressure chamber and said hydraulic path are filled or fillable with a pressure transfer liquid, in order to transfer a pressure presiding at said isolating diaphragm to said second opening;
 said tube has at least a form-retaining front section with a first average diameter and a form-retaining intermediate section with a second average diameter,
 said first end surface is formed by an end face of said front section,
 said first average diameter is greater than said second average diameter,
 said intermediate section is arranged between said front section and said flange; and
 said front section has a first axial length, and said intermediate section has a second axial length, wherein said first axial length is less than said second axial length.

2. The tube-equipped, flanged, pressure transfer structure as claimed in claim 1, wherein:
 said front section includes a lateral surface, which has at least one sealing surface, in order to seal said front section radially against said tubular opening.

3. The tube-equipped, flanged, pressure transfer structure as claimed in claim 2, wherein:
 said sealing surface includes an annularly surrounding recess, in order to guide a peripheral sealing ring at least partially axially.

4. The tube-equipped, flanged, pressure transfer means as claimed in claim 1, wherein:
 said first axial length is less than said first axial diameter.

5. The tube-equipped, flanged, pressure transfer structure as claimed in claim 1, wherein:
 said second axial length amounts to at least twice, especially at least four times, and preferably at least six times said first diameter.

6. The tube-equipped, flanged, pressure transfer structure as claimed in claim 1, wherein:
 said hydraulic path includes an especially traversing bore through said front section and said intermediate section with a diameter of no more than 2 mm, especially no more than 1 mm and preferably no more than 0.5 mm.

7. The tube-equipped, flanged, pressure transfer structure as claimed in claim 6, wherein:
 said bore is manufactured by means of one of:
 spark erosion and by means of water jet drilling.

8. A pressure measuring arrangement, comprising: a tube-equipped, flanged, pressure transfer structure, comprising: a flange for connecting the tube-equipped, flanged, pressure transfers structure to a tubular opening of a container or line, which tubular opening is surrounded by a counterflange; a tube, which is secured especially coaxially to said flange, and which protrudes from the plane of said flange, in order to protrude inwardly into said tubular opening; a hydraulic path, which extends from a first opening in a front end surface of said tube facing away from said flange through said tube and through the flange to a second opening in the rear end surface of said flange facing away from said tube; and an isolating diaphragm, which covers said first opening and is connected pressure-tightly with the front end surface of said tube along at least one peripheral edge, in order to form a pressure chamber between said isolating diaphragm and said front end surface of said tube, wherein: said pressure chamber and said hydraulic path are filled or fillable with a pressure transfer liquid, in order to transfer a pressure presiding at said isolating diaphragm to said second opening; said tube has at least a form-retaining front section with a first average diameter and a form-retaining intermediate section with a second average diameter, said first end surface is formed by an end face of said front section, said first average diameter is greater than said second average diameter, said intermediate section is arranged between said front section and said flange; and said front section has a first axial length, and said intermediate section has a second axial length, wherein said first axial length is less than said second axial length; and
 a pressure measurement transmitter with a pressure sensor, wherein:
 said pressure measurement transmitter is secured to the flange; and
 said pressure sensor is contactable with pressure presiding at said second opening.

9. Pressure measuring point, comprising: a tube-equipped, flanged, pressure transfer structure, comprising: a flange for connecting the tube-equipped, flanged, pressure transfers structure to a tubular opening of a container or line, which tubular opening is surrounded by a counterflange; a tube, which is secured especially coaxially to said flange, and which protrudes from the plane of said flange, in order to protrude inwardly into said tubular opening; a hydraulic path, which extends from a first opening in a front end surface of said tube facing away from said flange through said tube and through the flange to a second opening in the rear end surface of said flange facing away from said tube; and an isolating diaphragm, which covers said first opening and is connected pressure-tightly with the front end surface of said tube along at least one peripheral edge, in order to form a pressure chamber between said isolating diaphragm and said front end surface of said tube, wherein: said pressure chamber and said hydraulic path are filled or fillable with a pressure transfer liquid, in order to transfer a pressure presiding at said isolating diaphragm to said second opening; said tube has at least a form-retaining front section with a first average diameter and a form-retaining intermediate section with a second average diameter, said first end surface is formed by an end face of said front section, said first average diameter is greater than said second average diameter, said intermediate section is arranged between said front section and said flange; and said front section has a first axial length, and said intermediate section has a second axial length, wherein said first axial length is less than said second axial length; and a pressure measurement transmitter with a pressure sensor, wherein: said pressure measurement transmitter is secured to the flange; and said pressure sensor is contactable with pressure presiding at said second opening;
- a pressure measuring arrangement; and
- a line or a container having a tubular process opening and a counterflange around the process opening, wherein:
- said flange of the tube-equipped, flanged, pressure transfer structure is secured to said counterflange such that the tube-equipped, flanged, pressure transfer structure protrudes inwardly into said tubular opening.

10. The pressure measuring point as claimed in claim 9, wherein:
- said isolating diaphragm has an average plane, which is spaced no more than a diameter of said opening, preferably no more than half of a diameter, further preferably no more than a fourth of a diameter, from an intersection between the central axis of said opening with a surface through the edge of said opening in the region of said opening into the line or into the container, and which especially preferably contacts the surface.

11. The pressure measuring point as claimed in claim 9, wherein:
- said front section of said tube is radially sealed against the wall of said opening.

12. The pressure measuring point as claimed in claim 11, wherein:
- the radial sealing occurs by way of an elastic O-ring, which is radially clamped between the lateral surface and the wall of said tubular opening.

* * * * *